(12) United States Patent
Cueman et al.

(10) Patent No.: US 7,487,631 B2
(45) Date of Patent: Feb. 10, 2009

(54) SYSTEM AND METHOD FOR SUPPLYING REDUCTANTS TO AN EMISSION TREATMENT SYSTEM

(75) Inventors: Michael Kent Cueman, Schenectady, NY (US); Teresa Grocela-Rocha, Clifton Park, NY (US); Roy James Primus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 276 days.

(21) Appl. No.: 11/301,231

(22) Filed: Dec. 12, 2005

(65) Prior Publication Data

US 2007/0130918 A1    Jun. 14, 2007

(51) Int. Cl.
*F01N 3/00* (2006.01)
(52) U.S. Cl. ............................. 60/286; 60/274; 60/295; 60/297; 60/301; 60/303; 123/1 A; 123/3; 95/45; 95/47; 95/50; 95/54; 95/55
(58) Field of Classification Search .................. 60/274, 60/286, 295, 297, 301, 303; 123/1 A, 3; 95/45, 47, 50, 54, 55
See application file for complete search history.

(56) References Cited

U.S. PATENT DOCUMENTS

| | | | |
|---|---|---|---|
| 4,266,946 A | 5/1981 | Niebylski | |
| 4,479,473 A | 10/1984 | Wade | |
| 4,744,217 A | 5/1988 | Goerlich et al. | |
| 5,985,222 A | 11/1999 | Sudduth et al. | |
| 6,711,893 B2 * | 3/2004 | Ueda et al. | 60/285 |
| 6,887,300 B2 * | 5/2005 | Nemser | 95/45 |
| 6,919,047 B1 | 7/2005 | He et al. | |
| 6,968,678 B2 * | 11/2005 | Le Leux et al. | 60/280 |
| 7,017,336 B2 * | 3/2006 | Stiermann | 60/286 |
| 7,040,084 B2 * | 5/2006 | Ament | 60/274 |
| 7,204,081 B2 * | 4/2007 | Yasui et al. | 60/286 |
| 2004/0261403 A1 | 12/2004 | Asmus et al. | |

* cited by examiner

*Primary Examiner*—Binh Q. Tran
(74) *Attorney, Agent, or Firm*—Richard A. DeCristofaro

(57) ABSTRACT

System and method for supplying reductants to an emission treatment system. The system includes a fuel tank adapted to supply a premixed fuel stream that includes a primary component and a reductant component, and an engine in fluid communication with the fuel tank, wherein the engine is configured to create an emission. The engine includes an emission treatment system to treat the emission. The system also includes a separation system that includes a membrane with differential permeability for the reductant component relative to the primary component. The separation system is configured to receive at least a portion of the premixed fuel stream from the tank and to separate the premixed fuel stream into a first fraction and a second fraction. The first fraction includes a higher concentration of the reductant component than the second fraction, and the separation system is configured to supply the first fraction to the emission treatment system.

34 Claims, 3 Drawing Sheets

SYSTEM AND METHOD FOR SUPPLYING REDUCTANTS TO AN EMISSION TREATMENT SYSTEM

BACKGROUND

The present invention relates to a system and a method for operating an emission treatment system, and more particularly to supplying reductants to an emission treatment system to improve its NOx conversion efficiency.

Current emission control regulations necessitate the use of emission treatment systems to reduce catalytically nitrogen oxides (NOx) produced during engine operation into harmless exhaust gases in the exhaust systems of combustion powered vehicles, including locomotives, trucks, cars, and the like. These catalytic emissions treatment systems often use a reducing agent or reductant that is introduced into the diesel exhaust stream before the exhaust stream enters the system for treatment. Typical reducing agents may include light hydrocarbons and oxygen bearing compounds like alcohols.

Known methods of supplying the reductants may involve supplying the reducing agents and the fuel separately or may involve chemically producing the reducing agent in situ from the fuel itself. Such methods typically employ complex subsystems such as special purpose pumps, filters, storage tanks and the like. Additionally, these systems also require valuable space and specialized materials, thereby involving additional expenses. Therefore, there is need for an improved system and method for supplying the reductants to provide better overall economy and ease of operation.

BRIEF DESCRIPTION

Briefly, in accordance with one embodiment of the invention, there is provided a system for supplying reductants to an emission treatment system. The system includes a fuel tank adapted to supply a premixed fuel stream that includes a primary component and a reductant component, and an engine in fluid communication with the fuel tank, wherein the engine is configured to create an emission. The engine includes an emission treatment system to treat the emission. The system also includes a separation system that includes a membrane with differential permeability for the reductant component relative to the primary component. The separation system is configured to receive at least a portion of the premixed fuel stream from the tank and to separate the premixed fuel stream into a first fraction and a second fraction. The first fraction includes a higher concentration of the reductant component than the second fraction, and the separation system is configured to supply the first fraction to the emission treatment system.

In accordance with another embodiment of the invention, there is provided a method for supplying reductants to an emission treatment system. The method includes forming a premixed fuel stream by mixing a primary component and a reductant component, disposing an engine to receive the premixed fuel stream, wherein the engine is configured to create an emission and comprises an emission treatment system to treat the emission. The method also includes separating at least a portion of the premixed fuel stream into a first fraction and a second fraction, by passing the premixed fuel stream through a separation system, the separation system including a membrane with differential permeability for the reductant component relative to the primary component. The first fraction includes a higher concentration of the reductant component than the second fraction. The method further includes, supplying the first fraction of the fuel to the emission treatment system.

DRAWINGS

DETAILED DESCRIPTION

Figure 1:
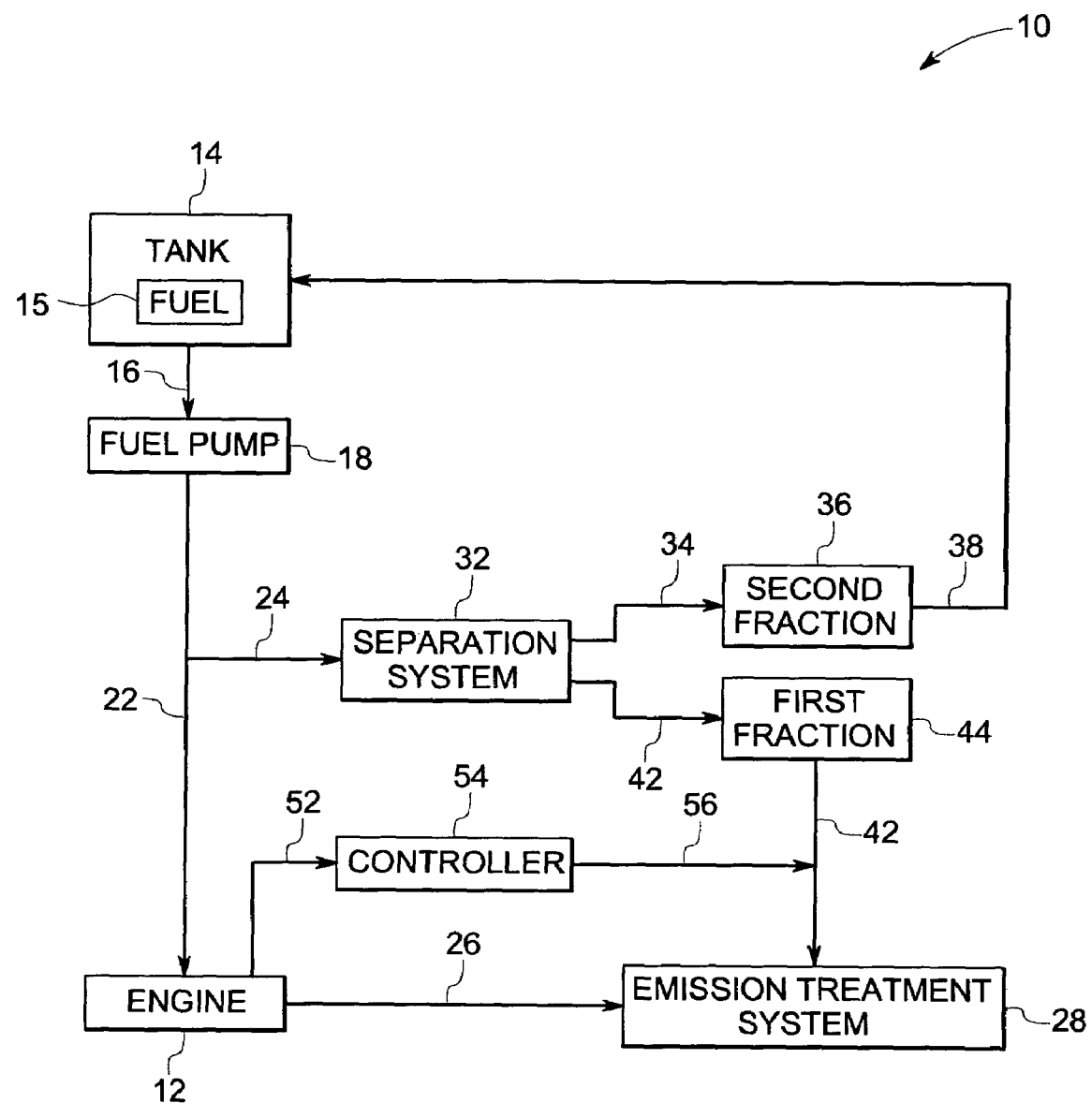
FIG. 1 is a schematic diagram of an exemplary system for supplying reductants to an emission treatment system in accordance with one embodiment of the invention.

FIG. 1 is a schematic diagram of an exemplary system 10 for supplying reductants to an emission treatment system in accordance with one embodiment of the invention. The system 10 includes an engine 12 that is supplied with a premixed fuel stream 15 from a fuel tank 14. The premixed fuel stream 15 includes a primary component, generally comprising a fuel suitable for operation of engine 12, and a reductant component, generally comprising reductant species ("reductants") suitable for use in NOx reduction as discussed below. The fuel tank 14 is adapted to supply the premixed fuel stream 15 to a fuel pump 18 via a supply line 16. The fuel pump 18 in turn is adapted to pump the premixed fuel stream 15 to the engine 12 via a supply line 22. A portion of the premixed fuel stream 15 is burnt in the engine 12 during operation of the engine and an emission of exhaust gases are produced thereby. The exhaust gases, thus produced, are discharged through a discharge line 26. The discharge line 26 carries the exhaust gases to an emission treatment system 28 where the emission is treated.

Referring to FIG. 1, the system 10 also includes a separation system 32 that in one embodiment of the invention includes a membrane (not shown) with differential permeability. Differential permeability in this case means that the permeability of the reductant component through the membrane is substantially different than that of the primary component and the difference is to such an extent that a separation of the two components occurs. In operation, the separation system 32 receives at least a portion of the premixed fuel stream 15 from fuel pump 18 via the supply line 24. The membrane separates the premixed fuel stream 15 into a first fraction 44 and a second fraction 36. Because the membrane serves to separate the reductant component from the primary component, the first fraction 44 of the fuel includes a higher concentration of the reductant component than the second fraction 36 of the fuel. In one embodiment of the invention, the first fraction 44 of the fuel is supplied directly to the emission treatment system 28 via a supply line 42. In another embodiment of the invention, one portion of the first fraction 44 of the fuel may be sent back to the fuel tank 14 or to the engine 12 directly. The second fraction 36 of the fuel coming out from the separation system 32 via supply line 34 is returned to the to the fuel tank 14 via a supply line 38 in one embodiment. In another embodiment of the invention, one portion of the second fraction 36 of the fuel may be sent to the engine 12 directly and burnt as the main fuel of the engine. In yet another embodiment of the system, if the system 10 is equipped with a diesel particulate filter that uses a fuel burner for regeneration, the second fraction 36 of the fuel may be sent to the fuel burner.

The actual type of membrane separation system may be selected from a non-exclusive list including reverse osmosis membrane separation systems, electro-kinetic separation systems and the like. The membranes disposed in the separation system may be selected from a non-exclusive list including polymeric, ceramic, carbon, and hybrids of these and may be homogenous or heterogeneous, symmetric or asymmetric in structure, solid or liquid, may carry a positive or negative charge or be neutral or bipolar. In many cases, the reductant component comprises chemical species having molecules of substantially smaller size than the molecules of fuel that are present in the primary component. Differential permeability in some embodiments is thus achieved by selecting, from those available membranes in the art, for example, a membrane having a pore size sufficient to allow the smaller component to move through the membrane while excluding the larger component. Transport of the reductant component through one such membrane may be effected by convection or by diffusion of individual molecules, induced by an electric field or concentration, pressure or temperature gradient. In one embodiment of the invention, the membrane separation system may be an ultrafiltration membrane separation system and the driving force for transport of the reductant components of the fuel across the membrane may be a pressure differential. The membrane materials in such ultrafiltration membrane separation system may include polymeric materials such as polysulfone, polypropylene, nylon 6, Polytetrafluoroethylene (PTFE), PVC, acrylic copolymer and the like. In another embodiment of the invention, inorganic materials such as ceramics, carbon based membranes, zirconia and the like may be used in the ultrafiltration based membrane separation systems. In yet another embodiment of the invention, the separation of reductant component from the primary component may be accomplished using selective facilitated transport membranes. Selective facilitated transport membranes with typically high reductant/fuel selectivity of about 200 may typically include cross-linked polyvinylalcohol-containing $AgNO_3$ membranes and Ag+-exchanged perfluorosulfonic acid membranes.

Referring to FIG. 1 once more, the emission treatment system 28, in one embodiment of the invention may include after-treatment devices in which NOx in the engine exhaust stream is continuously removed by reacting with active reductants in the presence of a catalyst to produce N2. In one embodiment of the invention, the catalysts may include oxidation catalysts that convert a portion of incoming NO to $NO_2$. In another embodiment of the invention, the catalysts may be lean NOx catalyst capable of reducing NOx in an oxygen rich environment. Efficiency of the reduction catalysts may be further increased in the presence of the reductants. Such reductants may typically include hydrocarbon compounds. A number of hydrocarbon reductants may typically be disposed along with the fuel, as described below herein.

In embodiments of the present invention, reductants are mixed with fuel in the fuel tank, and the fuel tank thus delivers a premixed fuel stream comprising a primary component (fuel) and a reductant component. Such reductants, according to one embodiment this invention, are useful in reducing the emissions from the engine 12. Suitable reductants may typically include oxygenates (hydrocarbons that include one or more oxygen atom in their molecules), hydrocarbons with molecular weight below a determined limit, hydrogen gas, and any combination thereof. The oxygenated hydrocarbons may include alcohols, aldehydes, and ketones, or combinations thereof. The alcohols may include methanol, ethanol, iso-propanol and the like. In one embodiment of the invention, the hydrocarbons may include esters such as methyl or ethyl esters. Esters are oxygenated organic compounds typically derived from a broad variety of renewable sources such as vegetable oil, animal fat and cooking oil that may be used in combustion engines. In another embodiment of the invention, the reductants may include aliphatic hydrocarbons such as isobutylene, isobutene and the like. The concentration of the reductants of this invention in the fuel mixture may typically be in the range of about 0.5% to 6% of the total fuel.

Referring to FIG. 1, in one embodiment of the invention, the fuel may be normal diesel fuel. In another embodiment of the invention, the fuel may be a renewable fuel. In one embodiment of the invention, the renewable fuel may be biodiesel, which consists of fatty acid methyl esters and may be made from vegetable oil, animal fat, or waste grease. Biodiesel is typically used as a blend with conventional diesel. In another embodiment of the invention, ethanol may also be blended into diesel fuel.

In yet another embodiment of the invention, Fischer-Tropsch diesel may be used as a renewable fuel that at times may be produced from biomass. Fischer-Tropsch or gas-to-liquid (GTL) fuels are typically created by Fischer Tropsch process that makes liquid diesel fuel from a synthetic mix of gases including CO and H2. Typical Fischer-Tropsch fuels may contain very low sulfur and aromatic content and very high cetane numbers. Fischer-Tropsch diesel fuels typically reduce regulated exhaust emissions from the engines and the vehicles where this fuel is used. Additionally, the low sulfur content of these fuels may enable use of advanced emission control devices.

In operation, as mentioned above, the membrane system 32 receives a portion of the premixed fuel stream 15 from the tank 14 and separates the premixed fuel stream 15 into a first fraction of the fuel and a second fraction of the fuel such that the first fraction of the fuel comprises a higher concentration of the reductant component than the second fraction of the fuel. The first fraction of the fuel is supplied to the emission treatment system 28. In one embodiment of the invention, the reductant component present in the first fraction of the fuel comprises an alcohol, such as methanol or ethanol or iso-propanol. The alcohol typically breaks down into hydrogen and carbon monoxide readily in the temperature range characteristic of diesel engine exhaust operating conditions prevailing in the hot catalyst beds of the emission treatment system 28. The thermal decomposition of the alcohols yields a molar hydrogen-to-carbon monoxide ratio of approximately two, and that ratio is typically more favorable for treatment of the emission than the ratio derived from diesel fuel alone. The alcohol forms neither particulate matter nor deposits when exposed to temperatures characteristic of diesel exhaust. Moreover, alcohols, such as methanol or ethanol or iso-propanol are sufficiently soluble in diesel fuel to enable the requisite quantity of the reductant to be conveyed to an emission treatment system via the engine fuel itself.

In one embodiment of the invention, hydrocarbon reductants may be used in order to aid in the production of oxygenated hydrocarbons, as represented by equation (1) below.

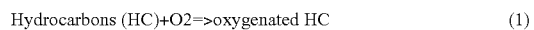
Hydrocarbons (HC)+O2=>oxygenated HC    (1)

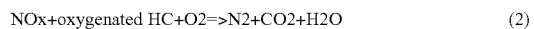
NOx+oxygenated HC+O2=>N2+CO2+H2O    (2)

The hydrocarbon reductants may include propene, ethanol, diesel fuel, or any other suitable hydrocarbons and the oxygenated hydrocarbons described below may include methanol, ethanol, propanol, butanol, pentanol, hexanol, methanal, ethanal, propanal, butanal, propenal, acetone, 2-butanone, and 3-penten-2-one and any combination thereof. Although the lean-NOx reducing reaction is a complex process comprising many steps, one of the reaction mechanisms for lean NOx catalysts may be summarized as follows. A hydrocarbon-enriched reductant may be converted to an activated, oxygenated hydrocarbon that may interact with the NOx compounds to form organo-nitrogen containing compounds.

Continuing to refer to FIG. 1, the system 10 in some embodiments further includes a controller 54 to control and coordinate the activities of all the components of system 10 and thereby to coordinate the overall functioning of the system 10. Structurally, the controller 54, as shown in FIG. 1, may be a conventional microcomputer, including conventional components such as microprocessor unit, input/output ports, read-only memory, random access memory, and conventional data bus. The controller 54 is in communication with the engine 12 by a sensing line 52 that typically carries a number of sensing signals representing various operating parameters of the engine 12. The operating parameters that may be sensed and estimated may include engine temperature, injection timing, air-fuel ratio, and various other parameters. Referring to FIG. 1 again, the controller 54 also communicates with the supply line 42 via command line 56 and thereby controls the amount of the reductant-rich first fraction 44 of the fuel that is diverted to the emission treatment system 28.

In operation, the controller 54 processes the signals representing the sensed operating parameters of the engine 12 and estimate the running condition of the engine 12 as well as the NOx level in the emission. In another embodiment of the invention, if estimated, the NOx level may be mapped and calibrated as a function of engine speed and load. In yet another embodiment of the invention, as will be described in relation to FIG. 2, the NOx level in the exhaust may be directly measured using a NOx sensor or one such system. The controller 54 may integrate the processed information and determine if the system parameters are indicative of proper control of the emission, and may further determine whether there is a need for supply of reductants to the emission treatment system 28. Accordingly the controller 54 monitors and controls the amount of the reductant-rich first fraction 44 of the fuel that is diverted to the emission treatment system 28 through supply line 42. Details of various sensors, the method of sensing the engine and emission parameters and the method of controlling the flow of the first fraction 44 of the fuel will be provided later in relation to FIG. 2.

Figure 2:
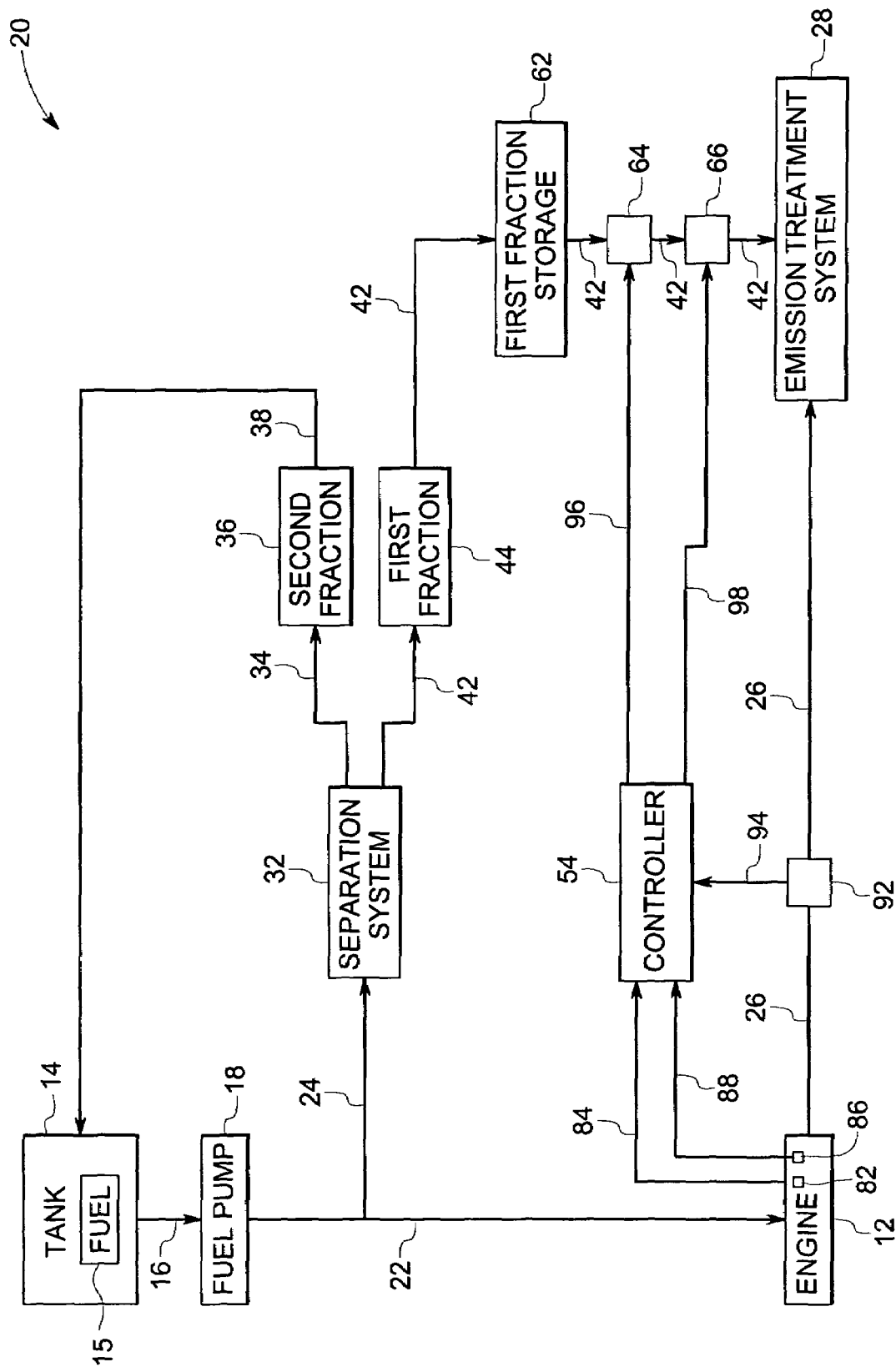
FIG. 2 is a schematic diagram of an exemplary system for supplying reductants to an emission treatment system in accordance with a second embodiment of the invention.

FIG. 2 is a schematic diagram of an exemplary system 20 for supplying reductants to an emission treatment system 28 in accordance with certain embodiments of the invention. The system 20 is enhanced over the system 10 illustrated in FIG. 1 by the addition of a storage tank 62 disposed in the supply line 42 to store the first (reductant-rich) fraction 44 of fuel that comes out of the separation system 32. The system 20 also includes a reductant injection pump 66, disposed in the supply line 42. The pump 66 is in communication with the controller 54 via command line 98 and the controller 54 directly controls and monitors the operation of the pump 66 to inject a portion of the first fraction 44 of the fuel from the storage tank 62 into the emission treatment system 28. The system 20 further includes a regulator 64 disposed in the supply line 42. The regulator 64 is coupled to the pump 66 and is in communication with the controller 54 via command line 96. The controller 54 controls and monitors the operation of the pump 66 through the regulator 64 to regulate the flow of the first fraction 44 of the fuel into the emission treatment system 28.

Referring to FIG. 2 again, the system 20 further includes a number of sensors 82, 86 and 92 installed to directly measure a number of engine operating parameters and emission parameters. As illustrated, temperature sensor 82 sends sensing signals representing temperature to the controller 54 via sensing line 84, pressure sensor 82 sends sensing signals representing pressure to the controller 54 via sensing line 84 and NOx sensor 92 sends sensing signals representing measured NOx level in the exhaust to the controller 54 via sensing line 94. In one embodiment of the invention the temperature sensed by the temperature sensor 82 may be the temperature of air (in degrees or Kelvin) fed to an intake manifold (not shown) of the engine 12. In another embodiment of the invention the temperature sensed by the temperature sensor 82 may be temperature of exhaust gas (in degrees or Kelvin) pumped from an exhaust manifold (not shown) of the engine 12. In yet another embodiment of the invention, the temperature sensed by the temperature sensor 82 may be temperature of exhaust gas fed from the exhaust manifold to a turbine (not shown). In a further embodiment of the invention the pressure sensed by the pressure sensor 86 may be intake manifold air pressure. Other than the storage tank 62, the regulator 64, the pump 66, the temperature sensor 82, the pressure sensor 86, the NOx sensor 92 and various sensing and command lines to and from the controller 54, the system 20 is substantially similar to system 10 shown in FIG. 1. Components of system 20 that are identical to components of system 10 are identified in FIG. 2 using the same reference numerals used in FIG. 1.

Referring to FIG. 2, the pump 66 is in communication with the controller 54 and the controller 54 may be operable to produce a signal as signified by command line 98 to control the operation of the reductant injection pump 66. In the illustrated embodiment, the pump 66 may be an electrically actuated fuel pump. In another embodiment of the invention, the fuel pump -66 may be a fuel injector. In operation, the fuel pump 66 typically injects a determined portion of the first fraction 44 of the fuel into the emission treatment system 28 as a function of the reductant injection command signal 98 received from the controller 54. The command signal 98 may typically include waveforms that are indicative of a desired injection rate, desired reductant injection timing, quantity of reductant-rich first fraction 44 of the fuel to be injected into the emission treatment system 28, or the like.

Referring to FIG. 2 again, the regulator 64 in one embodiment of the invention may be a vacuum regulator designed to provide an output vacuum varying from zero or a minimum to a maximum as a function of the changes in engine speed and, therefore, may provide an output vacuum force to the supply line 42 that is proportional to engine speed changes. In another embodiment of the invention, the regulator 64 may be a solenoid valve such that, opening and closing of the solenoid valve leads to more or less volume flow of the first fraction 44 of the fuel into the emission treatment system 28. The controller 54 communicates with the regulator 64 by command line 96 and thereby monitors and controls the opening and closing of the regulator 64.

Structurally, the controller 54 may include a micro-controller or a solid-state switch configured to communicate with the sensors 82, 86 and 92 and the regulator 64 and the pump 66. In one embodiment, the controller 54 may be an electronic logic controller that is programmable by a user. In another embodiment, the controller 54 may be an electronic reductant injection controller for the emission treatment system 28. The controller communicates with various components of the system 20 using the sensing lines 84, 88 and 94 and the command lines 96 and 98 as has been detailed earlier. In one embodiment of the invention, the controller 54 may include an analog-to-digital converter accessible through one or more analog input ports. In another embodiment, the controller 54 may include read-out displays, read-only memory (not shown), random access memory (not shown), and a conventional data bus (not shown).

As will be recognized by those of ordinary skill in the art, the controller 54 may be embodied in several other ways. In one embodiment, the controller 54 may include a logical processor (not shown), a threshold detection circuitry (not shown) and an alerting system (not shown). Typically, the logical processor is a processing unit that performs computing tasks. It may be a software construct made up using software application programs or operating system resources. The controller 54 may aid the threshold detection circuitry in estimating an emission parameter such as NOx efficiency, HC efficiency or CO efficiency based on the strength of the exhaust from the engine 12 as measured by the NOx sensor 92 or other such sensors. This estimate information of the emission parameter may be reported to a remote control unit (not shown) or to an alerting system (not shown) whether the emission treatment is progressing properly and the emission level is under control.

In one embodiment of the invention, the controller 54 may include a reductant injection quantity control logic that enables the controller 54 to inject a determined quantity of reductant into the emission treatment system 28. Control of injected reductant, in this example, is carried out according to the following approach. The primary indicators of need for reductant supply include, but are not limited to, the temperature, pressure of the engine and the NOx level in the emission. In operation, controller 54 monitors and controls the one or more of these parameters. In one embodiment, the controller 54 determines and interprets the temperature and the pressure of the engine based on the temperature sensing signals from the temperature sensors 82 and the pressure sensing signals from the pressure sensors 86 respectively. The NOx level in the emission may be either estimated from engine operating conditions (as in the embodiment of the invention illustrated in FIG. 1) or measured (as in the embodiment of the invention illustrated in FIG. 2) directly from sensing signals from the NOx level sensors 92 disposed in the system. The NOx level may be typically determined based on the characteristics of the sensor design, for example, from the sensor specification of NOx level sensors 92. Once the value of the NOx level is determined, the required reductant amount to treat the emission may also be determined and injected into the emission treatment system 28 accordingly.

The determination and interpretation of the required reductant amount by the controller 54 may be done in accordance with a predetermined criterion. For instance, in one embodiment, the predetermined criterion may include a binary comparison of the temperature, pressure and the NOx level with a predetermined reference value of temperature, pressure and the NOx level respectively. In another embodiment, the predetermined criterion may include comparison of the temperature, pressure and the NOx level with a predetermined maximum value of temperature, pressure and the NOx level respectively. In yet another embodiment, the predetermined criterion may include comparison of the temperature, pressure and the NOx level with a predetermined minimum value of temperature, pressure and the NOx level respectively. In yet another embodiment of the invention, the logic may determine an estimate of the NOx level in the exhaust based on engine speed and load.

Whatever the criterion for comparison, if the sensed temperature, pressure and the NOx level falls outside of the predetermined reference range, the controller 54 may determine that the supply volume of the reductants is not acceptable and the emission treatment system 28 needs extra reductants. In that event, the controller 54 sends a command signal to the regulator 64 and/or to the pump 66 so that an additional amount of reductants is diverted into the emission treatment system 28 through the first fraction 44 of the fuel. The process of controlling the flow of the first fraction 44 of the fuel is explained in more detail below. In another embodiment, if the controller 54 senses that the emission treatment system 28 needs extra reductants, it may send an alarm signal to the alerting system and the alerting system in turn generates an appropriate alarm to a process observer at a remote location (not shown) to supply more reductants. In yet another embodiment of the invention, the NOx sensor 92 may send a predetermined signal to the controller 54 whenever the NOx level exceeds a predetermined threshold.

The controller 54 as shown in FIG. 2 is enhanced over its configuration discussed in relation to FIG. 1 by incorporating an additional functionality of controlling the flow of the first fraction 44 of the fuel entering the emission treatment system 28. In one embodiment of the invention, the controller 54 communicates with the pump 66 directly by the command line 96 to achieve the control of the output from the pump 66. In another embodiment of the invention, the controller 54 controls the amount of the first fraction 44 of the fuel carried into emission treatment system 28 by controlling the opening and closing the regulator 64 and thereby controlling the amount output from pump 66. In yet another embodiment of the invention, the controller 54 may monitor and control the flow of the first fraction 44 of the fuel carried into emission treatment system 28 by monitoring and controlling the operation of both the regulator 64 and the pump 66 in tandem. In a further embodiment of the invention, the controller 54 may be equipped with a timer (not shown) to monitor and control the amount of the first fraction 44 of the fuel injected into the emission treatment system 28. In one such instance, a preselected constant time period may be used for a periodic reductant supply process to indirectly control the duration of injection. For so long as a predetermined threshold NOx level is not exceeded, normal engine operation continues. When this threshold is exceeded, the controller 54 monitors the supply of the first fraction 44 of the fuel and thereby monitors the supply of the reductants into the emission treatment system 28 until the NOx level comes down below an acceptable level. The supply of the first fraction 44 of the fuel and thereby the supply of the reductants into the emission treatment system 28 may be reduced or stopped at that moment.

Figure 3:
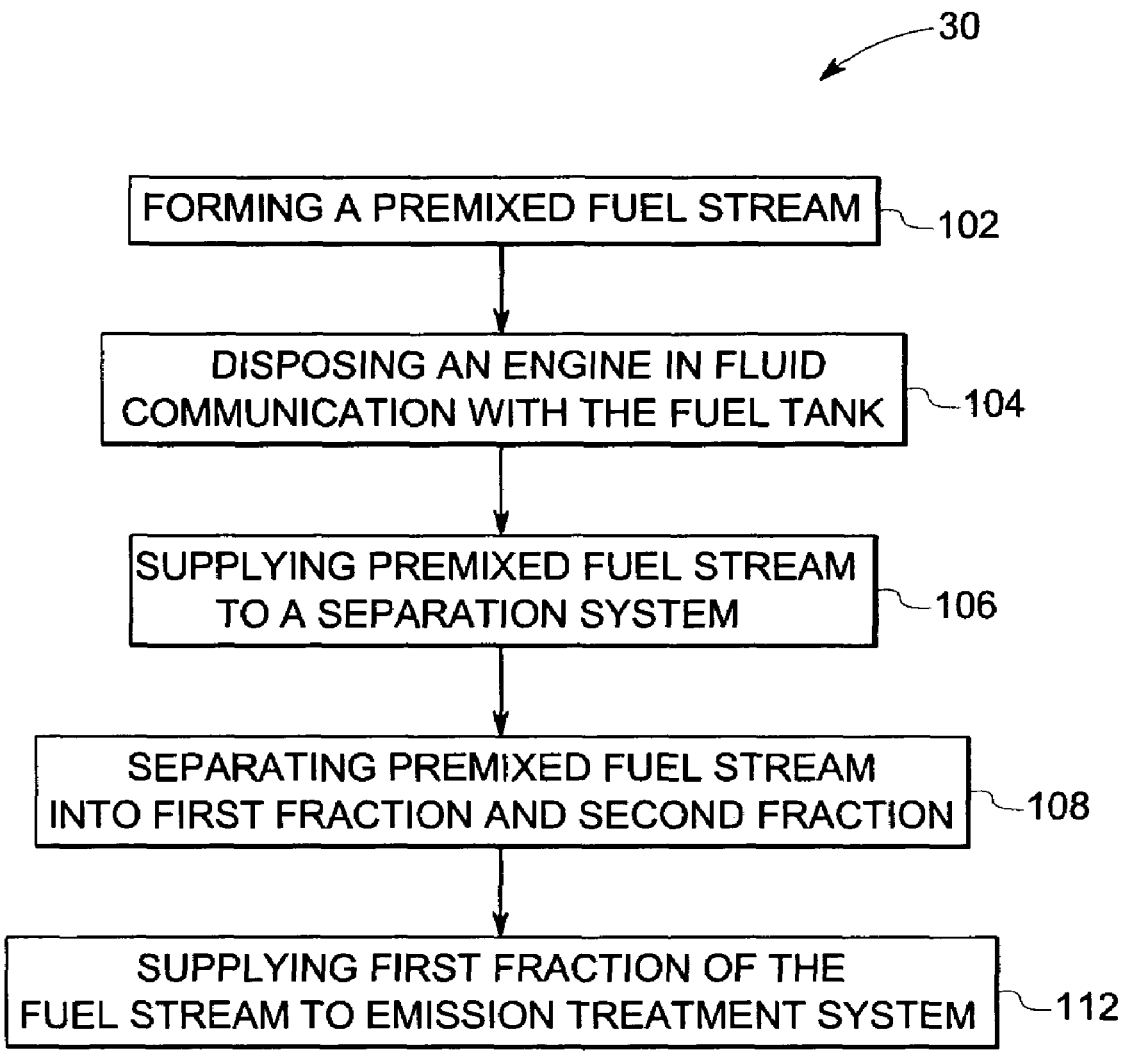
FIG. 3 illustrates a method for supplying reductants to an emission treatment system in accordance with one embodiment of the invention.

FIG. 3 illustrates an exemplary method 30 for supplying reductants to an emission treatment system in accordance with one embodiment of the invention. As will be appreciated by one of ordinary skill in the art, the method may represent one or more of processing strategies such as event-driven, interrupt-driven, multi-tasking, multi-threading, and the like. As such, various steps or functions illustrated herein may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

To this end, beginning at block 102, a premixed fuel stream is formed by mixing a primary component and a reductant component. An engine is disposed to receive the premixed fuel stream as in block 104. The engine is configured to create an emission and the engine may include an emission treatment system to treat the emission. The premixed fuel stream is supplied to a separation system as in block 106. The separation system includes a membrane with differential permeability for the reductant component relative to the primary component as described previously. Continuing, at least a portion of the premixed fuel stream is separated into a first fraction and a second fraction, by passing the premixed fuel stream through the separation system as in block 108. The first fraction of the fuel includes a higher concentration of the reductants than the second fraction. Finally, the first fraction of the fuel is supplied to the emission treatment system as in block 112 to aid the treatment of the emission.

The principles of the invention are not limited to any particular type of engine. One of ordinary skill will recognize that other embodiments of the invention may be suited for many of the combustion-powered vehicles. For example, internal combustion engines that are used in railroad locomotives, in vehicles that run on roads such as trucks, municipal transport vehicles, city buses, cars and other passenger vehicles or in ships may be installed with this type of reductant supply systems. The engine may also be a liquid fueled engine, a compression ignition engine, a gasoline engine, and any combination thereof. The gasoline engine may include a lean burn gasoline engine. A lean burn engine is one that produces an oxygen rich exhaust, which is defined as an exhaust having a higher molar ratio of oxygen than the total molar ratio of reductive compounds such as carbon-monoxide, hydrogen, hydrocarbons, and oxygenated hydrocarbons. The exhausts have an oxidative environment. Examples of such lean burn engine systems may include diesel engines, some natural gas or alternative fuel engines, liquid or gaseous-fueled turbine engines and various lean burn gasoline engine systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for supplying reductants to an emission treatment system, comprising:
   a fuel tank adapted to supply a premixed fuel stream comprising a primary component and a reductant component;
   an engine in fluid communication with the fuel tank, wherein the engine is configured to create an emission and comprises an emission treatment system to treat the emission;
   a separation system comprising a membrane with differential permeability for the reductant component relative to the primary component, the separation system configured to receive at least a portion of the premixed fuel stream from the tank; to separate the premixed fuel stream into a first fraction and a second fraction, wherein the first fraction comprises a higher concentration of the reductant component than the second fraction; and to supply the first fraction to the emission treatment system.

2. The system according to claim 1, further comprising a fuel pump adapted to pump the premixed fuel stream from the fuel tank to the engine.

3. The system according to claim 1, further comprising a storage tank to store the first fraction of the fuel, the storage tank disposed in fluid communication with the separation system.

4. The system according to claim 1, further comprising a controller that receives signals representing at least one determined operating parameter of the engine and directs at least a portion of the first fraction of the fuel into the emission treatment system in accordance with the signals.

5. The system according to claim 4, further comprising a pump disposed in fluid communication with the separation system and in communication with the controller, to pump the at least a portion of the first fraction of the fuel into the emission treatment system.

6. The system according to claim 5, further comprising a regulator coupled to the pump and in communication with the controller to regulate the flow of the at least a portion of the first fraction of the fuel from the pump in the emission treatment system.

7. The system according to claim 4, further comprising at least one sensor in communication with the controller to sense the at least one determined engine operation parameter.

8. The system according to claim 7, wherein the engine operation parameter comprises at least one selected from the group consisting of pressure, temperature, and any combination thereof.

9. The system according to claim 4, further comprising a NOx sensor in communication with the controller to directly determine a NOx level in the emission.

10. The system according to claim 1, wherein the fuel comprises at least one element selected from the group consisting of diesel fuel, biodiesel fuel, Fischer-Tropsch fuel, and any combination thereof.

11. The system according to claim 1, wherein the engine comprises at least one element selected from the group consisting of a liquid fueled engine, a compression ignition engine, a gasoline engine, and any combination thereof.

12. The system according to claim 11, wherein the gasoline engine comprises a lean burn gasoline engine.

13. The system according to claim 1, wherein the reductants comprise at least one element selected from the group consisting of an oxygenate, a hydrocarbon, hydrogen gas, and any combinations thereof.

14. The system according to claim 13, wherein the hydrocarbon comprises a hydrocarbon with molecular weight less than 115.

15. The system according to claim 13, wherein the hydrocarbon comprises an aliphatic hydrocarbon.

16. The system according to claim 13, wherein the hydrocarbon comprises at least one compound selected from the group consisting of an alcohol, an ester, and any combination thereof.

17. The system according to claim 16, wherein the alcohol comprises at least one compound selected from the group consisting of methanol, ethanol, iso-propanol, and any combination thereof.

18. A system for supplying reductants to an emission treatment system, comprising:
   a fuel tank adapted to supply a premixed fuel stream comprising a primary component and a reductant component;
   an engine in fluid communication with the fuel tank, wherein the engine is configured to create an emission and comprises an emission treatment system to treat the emission;
   a separation system comprising a membrane with differential permeability for the reductant component relative to the primary component, the separation system configured to receive at least a portion of the premixed fuel stream from the tank, to separate the premixed fuel stream into a first fraction and a second fraction, wherein the first fraction comprises a higher concentration of the reductant component than the second fraction, and to supply the first fraction to the emission treatment system;

a fuel pump adapted to pump the premixed fuel stream from the fuel tank to the engine;

a storage tank to store the reductants, the storage tank disposed in fluid communication with the separation system;

a controller that receives signals representing at least one determined operating parameter of the engine and directs at least a portion of the first fraction of the fuel into the emission treatment system in accordance with the signals;

a pump disposed in fluid communication with the separation system and in communication with the controller, to pump at least a portion of the first fraction of the fuel into the emission treatment system;

a regulator coupled to the pump and in communication with the controller to regulate the flow of at least a portion of the first fraction of fuel from the pump in the emission treatment system; and at least one sensor in communication with the controller to sense at least one determined engine operation parameter; and a NOx sensor in communication with the controller to directly determine a NOx level in the emission.

19. A method for supplying reductants to an emission treatment system, comprising:

forming a premixed fuel stream by mixing a primary component and a reductant component;

disposing an engine to receive the premixed fuel stream, wherein the engine is configured to create an emission and comprises an emission treatment system to treat the emission;

separating at least a portion of the premixed fuel stream into a first fraction and a second fraction, by passing the premixed fuel stream though a separation system, the separation system comprising a membrane with differential permeability for the reductant component relative to the primary component, wherein the first fraction comprises a higher concentration of the reductant component than the second fraction; and supplying the first fraction of the fuel to the emission treatment system.

20. The method according to claim 19, further comprising storing the first fraction of the fuel in communication with the separation system.

21. The method according to claim 19, further comprising sensing at least one determined operating parameter of the engine and directing at least a portion of the first fraction of the fuel in the emission treatment system in accordance with the sensed signals.

22. The method according to claim 21, further comprising pumping at least a portion of the first fraction of the fuel in communication with the separation system into the emission treatment system in accordance with the sensed signals.

23. The method according to claim 22, further comprising regulating the flow of at least a portion of the first fraction of the fuel in the emission treatment system in accordance with the sensed signals.

24. The method according to claim 21, wherein at least one determined engine operation parameter comprises at least one element selected from the group consisting of pressure, temperature, and any combination thereof.

25. The method according to claim 21, further comprising directly determining a NOx level in the emission and directing at least a portion of the first fraction of the fuel in the emission treatment system in accordance with the determined NOx level.

26. The method according to claim 19, wherein the fuel comprises at least one element selected from the group consisting of diesel fuel, biodiesel, Fischer-Tropsch fuel, and any combination thereof.

27. The method according to claim 19, wherein the engine comprises at least one element selected from the group consisting of a liquid fueled engine, a compression ignition engine, a gasoline engine, and any combination thereof.

28. The method according to claim 27, wherein the gasoline engine comprises a lean burn gasoline engine.

29. The method according to claim 18, wherein the reductants comprise at least one element selected from the group consisting of an oxygenate, a hydrocarbon, hydrogen gas, and any combinations thereof.

30. The method according to claim 29, wherein the hydrocarbon comprises a hydrocarbon with molecular weight less than 115.

31. The method according to claim 29, wherein the hydrocarbon comprises an aliphatic hydrocarbon.

32. The method according to claim 29, wherein the hydrocarbon comprises at least one element selected from the group consisting of an alcohol, an ester, and any combination thereof.

33. The method according to claim 32, wherein the alcohol comprises at least one element selected from the group consisting of methanol, ethanol, iso-propanol, and any combination thereof.

34. The method according to claim 19, further comprising sending the second fraction of the fuel back to the fuel tank.

* * * * *

UNITED STATES PATENT AND TRADEMARK OFFICE
CERTIFICATE OF CORRECTION

PATENT NO.       : 7,487,631 B2
APPLICATION NO.  : 11/301231
DATED            : February 10, 2009
INVENTOR(S)      : Cueman et al.

Page 1 of 1

It is certified that error appears in the above-identified patent and that said Letters Patent is hereby corrected as shown below:

In Column 11, Line 38, in Claim 19, delete "though" and insert -- through --, therefor.

Signed and Sealed this

Thirty-first Day of March, 2009

JOHN DOLL
*Acting Director of the United States Patent and Trademark Office*